July 9, 1929.                   C. A. NEAL                      1,720,563
                                 PACKING
                          Filed Nov. 30, 1926
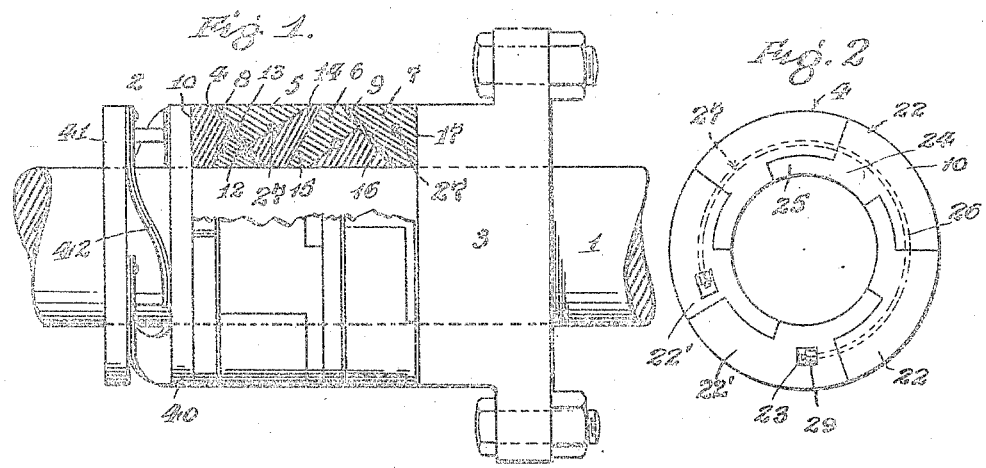
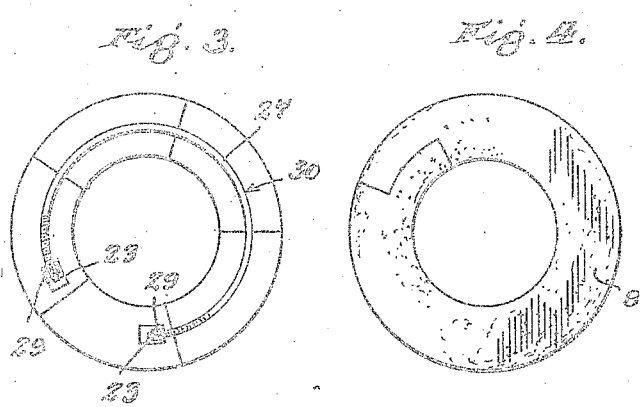
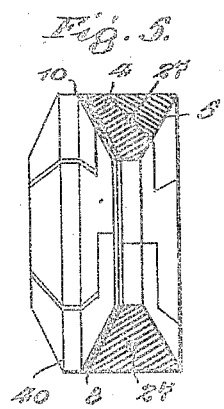
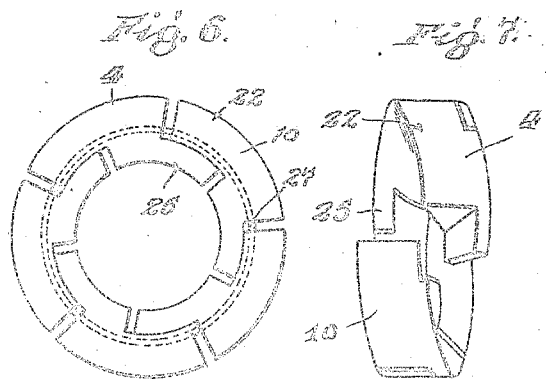
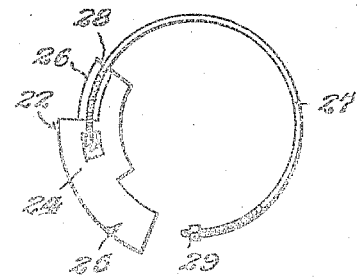
INVENTOR
C. A. Neal,
BY
ATTORNEYS Patented July 9, 1929.

1,720,563

UNITED STATES PATENT OFFICE.

CLARENCE A. NEAL, OF ROCKMART, GEORGIA.

PACKING.

Application filed November 30, 1926. Serial No. 151,735.

This invention relates in general to a packing which, while especially designed for use on pumps, compressors and the like, is also adapted for universal use.

A primary object of the invention is to provide a packing of this character which is simple and practical and yet capable of successful dealing with all the different packing conditions encountered in connection with engines, pumps and compressors.

Another object of the invention is to provide a packing in which the necessity of constantly adjusting the packing nuts and glands is obviated and yet a proper and effective packing is maintained wherein the packing action is uniformly and evenly distributed, thus preventing scoring of the element being packed by uneven pressures and also eliminating vibration.

Still another object is to provide a novel and unique means for maintaining the packing elements in proper packing position and to provide a novel form of packing element which while readily separable to facilitate assembly and disassembly is held in assembled position when not in use.

Other objects and advantages reside in certain novel features of construction, arrangement and combination of parts which will be hereinafter more fully described and particularly pointed out in the appended claims, reference being had to the accompanying drawings forming a part of the specification and in which:—

Figure 1 represents a view partly in section and partly in elevation showing the packing embodying the present invention, Figure 2 represents a side elevation of a packing ring constructed in accordance with this invention with the segments shown in operative position ready for use, Figure 3 is a similar view taken from the other side of the ring, Figure 4 is a side elevation of the gasket employed in connection with the packing, Figure 5 is a front elevation partly in section showing the outer and inner rings jointed and fitted in connection with the gasket, which latter is shown in cross section, Figure 6 is a view similar to Fig. 2 showing the segments separated in position for applying the ring, Figure 7 is an edge or front elevation showing the ring partly open ready for application or removal, and Figure 8 represents a single segment with the centrally located binding member attached.

In the embodiment illustrated the packing constituting this invention is shown in conjunction with a shaft 1 rotatably mounted in a bearing provided therefor in a cylindrical support 2, the gland 3 being threaded into the said cylindrical support.

The packing which constitutes the invention includes a plurality of rigid packing elements 4, 5, 6 and 7 with gasket rings 8 and 9 arranged respectively between the elements 4 and 5 and 6 and 7. All of these elements are of annular form and the gasket elements 8 and 9 may be of any suitable material such as a composition of canvas or duck and rubber, or of asbestos, lead or copper, while the elements 4, 5, 6 and 7 are constructed of suitable metal, the metal for friction rings being preferably more or less soft and outer rings of tin, brass, iron, steel and the like, said elements being substantially triangular in cross section.

As shown in Fig. 1, the packing element 4 has a flat face 10 which abuts a ring 40 between which and a similar ring 41 are arranged springs 42. The packing ring 4 also has an inclined face 12 between which and a correspondingly inclined face 13 on the element 5 is arranged the gasket 8. The packing element 5 has its opposite face 14 inclined and engaging a correspondingly inclined face 15 on the packing element 6. The packing element 6 has an inclined face 16 between which and a correspondingly inclined face 17 of the element 7 is arranged the gasket ring 9. The element 7 has a flat outer face 17 which abuts the gland 3.

In the formation of these inclined side or lateral faces, the elements 4, 5, 6 and 7 differ somewhat in size depending upon the conditions encountered but they essentially all involve the same construction and each is made up of a plurality, preferably 5, similar sections 22. Each section 22 has a centrally located body portion 24 and oppositely directed and transversely reduced ends 25 and 26, the ends 25 and 26 interfitting with inclined matched faces in the assembly whereby the sections 22 constitute a complete annulus.

The sections 22 are provided with circumferentially extending passages which are alined in the assembly and constituted by openings 27 formed in the body portion 24 and complementary grooves 28 provided in the extensions 25 and 26.

With the sections of each rigid packing element, a flexible binding member 30 is associated. This element 30 is preferably constructed of twisted strand wire, steel strands being preferably used although not necessarily and in some cases, brass, copper, iron or the like may be used. This wire 30 serves as an axis or guide upon which the ring segments operate and which passes freely and loosely through the passages 27 and through the central portions of all the segments except two, which are shown at 22' and which have a free lapped joint. These segments 22' have enlarged cylindrical recesses 23 which form chambers to receive heads 29 carried by the ends of the wire 30. This arrangement of the enlarged heads 29 operable in the cylinders or chambers 23 provides for the holding of the segments together to prevent misplacement when not installed and to hold them in alinement to insure easy and simple application on a rod or plunger. They also form a guide upon which the segments are held in proper relation to the rod or plunger in case of adjustment in circumferential slidable movement to accommodate itself to expansion, contraction or wear of the metal. These wires 30 operate also to press or clamp the segments to the rod or plunger in close or snug relation to insure an efficient packing means immediately upon application.

It will thus be seen that this binding wire constructed and mounted as herein shown and described constitutes an important feature of the invention.

In the application of the rings the segments 22' are separated endwise as shown in Fig. 7, being twisted slightly in opposite directions, which is permitted by the sliding relation between the segments and the binding wire. The ring may thus be readily taken off or applied to the shaft without separating entirely the segments constituting it.

The gist of the invention resides in the formation of the rings in a plurality of segments operating on a central binding element with gaskets used between the rings so that a leak proof packing is formed.

By virtue of the inclined faces of the engaging packing elements 4, 5, 6 and 7 with the gaskets 8 and 9, the packing elements are urged into proper packing position with respect to each other and with respect to the shaft which they pack, when subjected to longitudinal compression. This longitudinal compression of the packing elements, as shown, includes the rings 40 and 41 with the springs 42 between them so that when the packing gland 3 is screwed inward the pressure is passed transversely from the gland to the packing elements. The springs 42 which are employed to secure this resiliency of action as well as to provide for take up of wear and avoid the necessity of frequent adjustment, are located between the rings 40 and 41 and are designed to maintain said rings in spaced relation even when tightly compressed.

With this arrangement, when the packing is placed in position and the gland 3 properly tightened up, the compression which sets up in the springs 42 will keep the packing in proper adjustment over a long period and due to the novel co-action between the elements of the packing, the pressure and packing action is evenly distributed, thereby preventing scoring of the shaft 1, while effectively packing it. Moreover, vibration is prevented and the packing is equally effective with any liquid or fluid and may be used to advantage with practically any type of engine, pump or compressor, as well as for many other purposes.

I claim:—

1. A packing element composed of a plurality of sections, each section having a central body with oppositely directed transversely reduced ends, the ends of one section interfitting those of another, having inclined match faces and each body having a circumferential passage, the passages of the respective sections registering, and a flexible binding member threaded through said passages and provided at its ends with heads, two adjacent sections having enlarged recesses to receive said heads whereby the sections are held together and yet permitted to separate a predetermined distance.

2. A packing element composed of a plurality of sections each of which has a central body with oppositely directed transversely reduced ends, the ends of one section interfitting and lapping those of another section, a flexible element slidably connecting said sections, two sections and said element having an interlocking connection with each other whereby said last mentioned sections are permitted to separate and the other sections held connected.

CLARENCE A. NEAL.